(12) United States Patent
Schmidt et al.

(10) Patent No.: US 7,845,220 B2
(45) Date of Patent: Dec. 7, 2010

(54) HYDRAULIC/PNEUMATIC CHARGING VALVE WITH INTEGRATED PRESSURE TRANSDUCER

(75) Inventors: R. Kyle Schmidt, Bailly (FR); Simon Hou, Toronto (CA)

(73) Assignee: Messier-Dowty Inc., Ajax, Ontario (CA)

( * ) Notice: Subject to any disclaimer, the term of this patent is extended or adjusted under 35 U.S.C. 154(b) by 754 days.

(21) Appl. No.: 11/844,900

(22) Filed: Aug. 24, 2007

(65) Prior Publication Data

US 2009/0293624 A1 Dec. 3, 2009

Related U.S. Application Data

(60) Provisional application No. 60/840,974, filed on Aug. 30, 2006.

(51) Int. Cl.
*G01P 13/00* (2006.01)
*B64C 25/00* (2006.01)

(52) U.S. Cl. ................ 73/170.02; 244/100 R (58) Field of Classification Search .............. None
See application file for complete search history.

(56) References Cited

U.S. PATENT DOCUMENTS

| 4,181,156 A | 1/1980 | Zahid | |
|---|---|---|---|
| 4,524,929 A * | 6/1985 | Gebhard | 244/63 |
| 4,676,306 A | 6/1987 | Russell | |
| 4,889,202 A | 12/1989 | Bron | |
| 5,258,582 A | 11/1993 | Junginger | |
| 5,511,430 A | 4/1996 | Delest et al. | |
| 5,521,827 A | 5/1996 | Lindberg et al. | |
| 5,548,517 A | 8/1996 | Nance | |
| 5,987,980 A * | 11/1999 | Mangafas et al. | 73/146.8 |
| 6,293,141 B1 | 9/2001 | Nance | |
| 6,354,152 B1 | 3/2002 | Herlik | |
| 2005/0211831 A1 * | 9/2005 | Courtois et al. | 244/102 R |
| 2007/0221783 A1 * | 9/2007 | Parks et al. | 244/102 A |
| 2008/0125980 A1 * | 5/2008 | El-Bakry et al. | 702/34 |

* cited by examiner

*Primary Examiner*—Andre J Allen
(74) *Attorney, Agent, or Firm*—Katten Muchin Rosenman LLP (57) ABSTRACT

The present invention is a device that allows the pressure inside an aircraft landing gear shock strut to be measured. A charging valve is modified by integrating a small pressure sensing device into the stem of the part such that the active diaphragm is subjected to the pressure within the charged vessel. The wires from the pressure sensing device are connected to a receptacle or connector in the bore of the stem such that a corresponding electrical receptacle may be mated for the purposes of making a measurement. The internal receptacle is designed such that the flow of air or oil is not excessively impeded and normal servicing tools do not interfere with the receptacle.

25 Claims, 13 Drawing Sheets

HYDRAULIC/PNEUMATIC CHARGING VALVE WITH INTEGRATED PRESSURE TRANSDUCER

CLAIM FOR PRIORITY

The present application claims priority under 35 U.S.C. §119(e) to U.S. Provisional Application No. 60/840,974, filed Aug. 30, 2006, the entire contents of which are incorporated herein by reference.

FIELD OF THE INVENTION

The present invention relates to aircraft landing systems and more particularly to a device for measuring the pressure inside a landing gear shock strut. This invention is particularly useful for retrofit applications where drilling a new hole or changing the volume of the shock strut by the addition of a normal pressure transducer is not acceptable.

BACKGROUND OF THE INVENTION

Shock strut pressure is measured during maintenance of landing gear and other pressure vessels to ensure proper performance. The physical geometry of these pressure vessels (such as landing gear shock absorbers) determine (along with fluid and gas volumes) the behaviour and performance of the vessel. Measuring the pressure of the gas within the shock absorber is a critical task that must be performed regularly to ensure safe operation of the aircraft. This is presently performed by attaching a gauge to the external port of the charging valve, then opening the valve. This action is suboptimal because it requires a manual operation to connect and read the system, and because it involves the opening and closing of the valve (with the attendant loss of a small amount of fluid or gas).

In order to reduce the amount of required maintenance, an automatic means of measuring the pressure of fluid within the shock strut is desired. Conventional approaches to this problem would involve the mounting of a pressure transducer either directly into the body of the shock strut, or the fitting of a manifold to the existing port to allow both a pressure measurement and a facility to charge (alter the quantity of fluid and gas). Both of these solutions present problems when they are applied to existing shock strut designs. Fitting a transducer into the body of the shock strut involves drilling a hole in the structure of the strut—which is generally not acceptable from a strength or fatigue perspective. Adding a manifold to the shock strut changes the amount of internal working volume, which changes the energy absorbing properties of the landing gear—which is not desirable.

Many landing gears have a poppet charging valve conforming to MS28889-2/MIL-PRF-6164F. This valve allows the introduction or removal of fluid and gas from the pressure vessel. The present invention modifies this valve to include a pressure-sensing means and electrical contact means such that measurements may be made of the working fluid without interfering with the normal operation of the valve or significantly altering the volume within the pressure vessel.

This modified valve can be retrofitted to any landing gear to allow pressure measurements to be made without altering the landing gear. A change in military standards from MS28889-2 to the newer performance based specification—MIL-PRF-6164F allows the certification of a modified valve to act as a replacement for existing valves.

SUMMARY OF THE INVENTION

At the base, the design involves introducing a pressure sensitive element on one end of the valve and providing a route for the measurement wires to a connector that is mounted internally in the valve stem. The connector is configured in such a manner that it does not interfere with normal pressure charging apparatus, but a specially designed electrical connector can connect to the valve for determining the pressure either in flight or on the ground.

In one aspect the present invention provides a charging valve for use in a pressure vessel in an aircraft landing gear comprising a valve stem having a first and second end and a channel extending therebetween, a pressure-sensing device received within the channel at the first end and operable to measure the pressure of the pressure vessel, and a receptacle received within the channel between the pressure-sensing device and the second end and operable to be in communication with the pressure-sensing device and configured to allow fluid to flow through the valve.

In another aspect the present invention provides a charging valve for use in a pressure vessel in an aircraft landing gear comprising a valve stem having a first and second end and a channel extending therebetween, a pressure reading means connected to the first end of the valve body for reading the pressure in the pressure vessel and a receptacle received within the channel between the pressure reading means and the second end and operable to be in communication with the pressure reading means and configured to allow fluid to flow through the valve.

In a further aspect the present invention provides a method of modifying a charging valve having a main body including a channel therethrough, to include a pressure measuring device for use in a pressure vessel comprising the steps of (i) placing a pressure-sensing device within the channel at the end of the valve that is in communication with the pressure vessel to allow the pressure-sensing device to measure the pressure within the vessel; (ii) connecting the pressure-sensing device to a receptacle or connector to allow for communication therebetween, the receptacle being located within the channel of the valve at the opposite end of the pressure-sensing device from the measurement end and being operable to allow for fluid to flow through the valve. The pressure-sensing device may be a pressure transducer or may include a modification to the end of the valve to form a pressure sensitive diaphragm that is gauged.

In another aspect, the present invention provides a retrofit kit for use in a charging valve used with a pressure vessel comprising a pressure-sensing device sized to be received within the channel of the valve at the first end and operable to measure the pressure of the pressure vessel and a receptacle sized to be received within the channel of the valve and operable to be in communication with the pressure-sensing device and configured to allow fluid to flow through the valve. The pressure-sensing device and receptacle are as described herein.

BRIEF DESCRIPTION OF THE DRAWINGS

The present invention will now be described in further detail with reference to the following figures:

FIG. 9b is a perspective view illustrating the mating connection of the plug and the receptacle of FIG. 9a;

DESCRIPTION OF THE PREFERRED EMBODIMENTS

The present invention provides a modified charging valve having a pressure sensitive element at one end and a connector or receptacle mounted within it. The receptacle is configured to determine pressure within the valve either in flight or on the ground with minimal interference with the normal pressure charging apparatus.

The modified valve of the present invention utilises the structure of known valves used in the art and incorporates within it a pressure-sensing device and a receptacle or connector that allows for pressure measurements to be made as desired without interfering with the normal operation of the valve and with minimal alteration of the volume of the working fluid within the pressure vessel. Pressure vessels and charging valves are known in the art and therefore are not described in detail herein. In an alternative embodiment, the existing end of the valve can also be modified to form a pressure sensitive diaphragm and then be gauged.

The valve of the present invention will now be described in further detail with reference to the accompanying figures.

Figure 1:
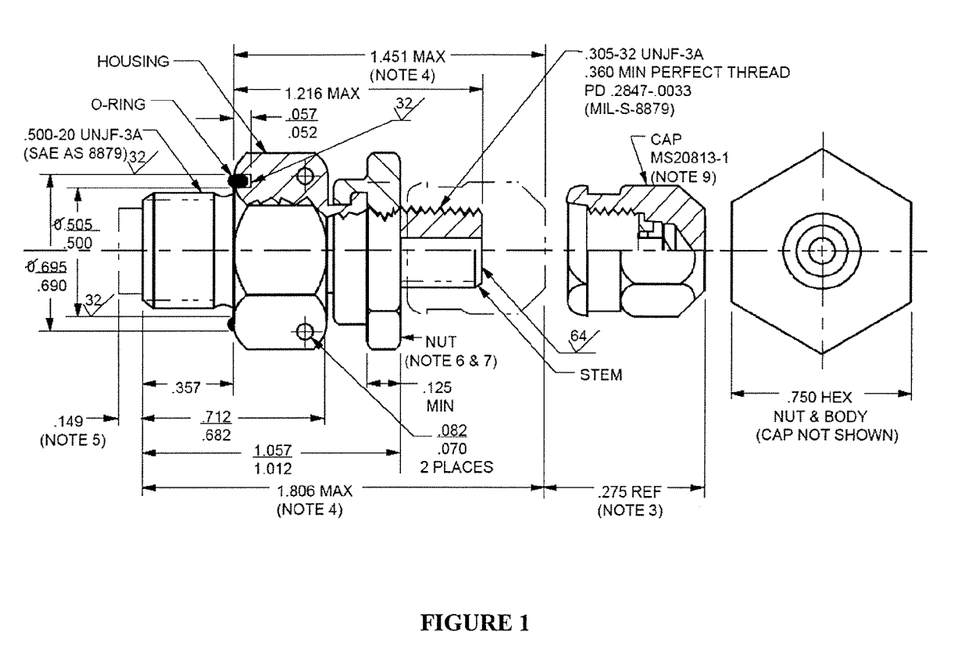
FIG. 1 is a schematic diagram of the standard geometry of a charging valve.

FIG. 1 provides a schematic diagram of the standard valve geometry. As stated above, the present invention utilises the structure of valves known in the art. As will be described, the valve is modified to accommodate, for example, the pressure-sensing device, the receptacle and a measuring device. Generally such known valves include a main body (also referred to as a valve stem herein), that has a central channel, or bore, that extends from one end of the body to the other. The present invention incorporates the use of a pressure-sensing device and receptacle within the channel of the body, as described below.

Figure 2:
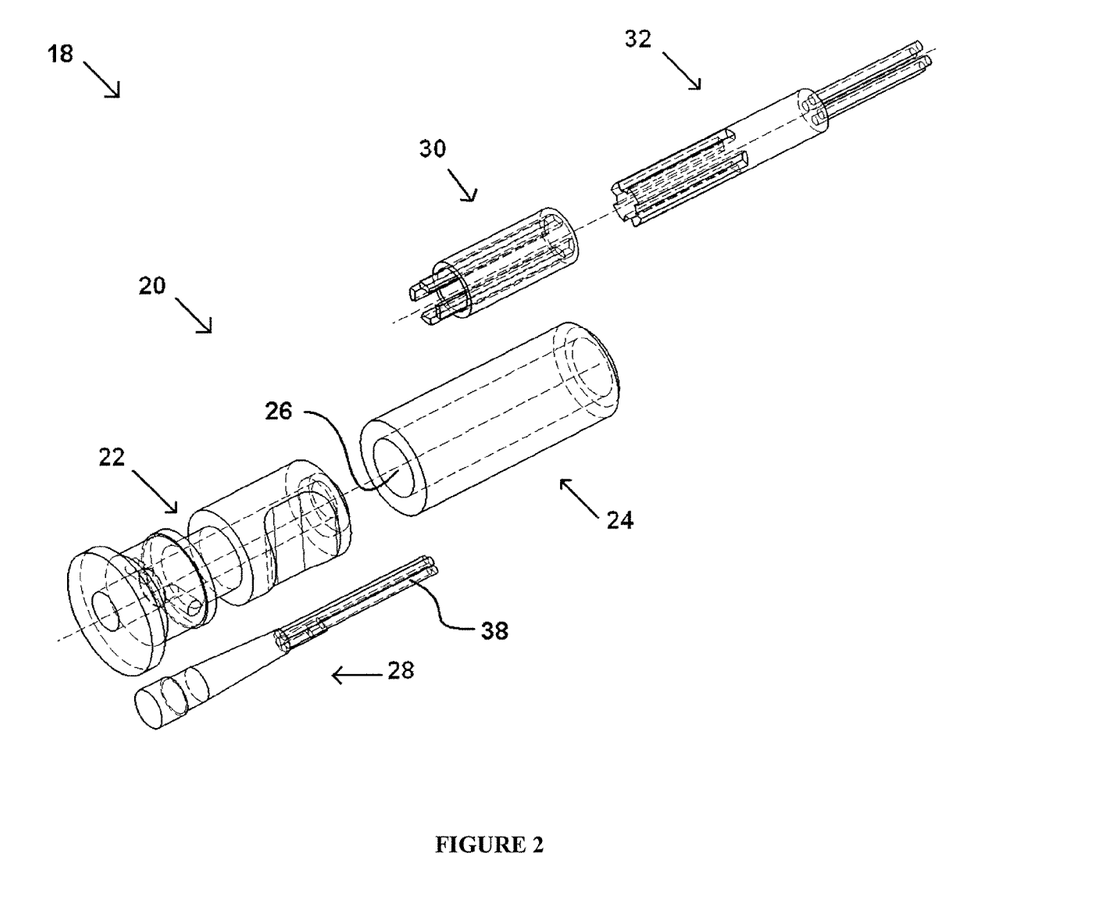
FIG. 2 is an exploded perspective view showing the valve stem of the present invention in two portions and the pressure-sensing device, connector and plug to be used with the valve.

Referring to FIG. 2, one embodiment of the modified valve of the present invention will be described in further detail. FIG. 2 is an exploded perspective view illustrating the components of the modified valve, indicated in the Figures at numeral 18, which includes a valve stem 20 which is illustrated in two portions, a first portion 22 and a second portion 24. It will be understood that the modified valve 18 of the present invention may comprise one main body that does not consist of two separate parts, however in a preferred embodiment the valve main body comprises two portions to assist in the assembly of the modified valve. The description of the modified valve will make reference to a two part valve body, however a person skilled in the art will understand that a one part valve body may also be used. The stem 20 includes an elongate channel 26 that extends through the stem 20 from one end to the other, i.e. through the first and second portions 22, 24.

The modified valve 18 also includes a pressure-sensing device 28 and a receptacle 30. The modified valve 18 may optionally include a plug 32 or the plug 32 may be a separate component that is used in combination with the modified valve 18 when a pressure reading is required, discussed in further detail below.

The pressure-sensing device 28 may be any pressure-sensing device or transducer that is operable to measure pressure and is sized to be received within the first portion 22 of the stem 20. In an alternative embodiment, the channel 26 may be widened, for example by boring, to incorporate the pressure-sensing device 28. The pressure-sensing device 28 is fixedly attached to the end of the first portion 22 by any means known in the art, for example welding, using a laser or other means, fixed using an adhesive or mechanically retained within the channel 26. The connection of the pressure-sensing device 28 within the channel 26 may be by any means that allows the pressure-sensing device 28 to measure the pressure in the pressure vessel to which the valve 18 is attached.

Examples of the type of a pressure-sensing device 28 that may be used include, but is not limited to resistive strain gauges and capacitive gauges. The modified valve 18 of the present invention may also include a temperature sensitive element (not shown). Examples of the type of temperature sensitive elements that may be used include a thermocouple and a resistance temperature detector (RTD). As will be understood by a person skilled in the art, the pressure sensing device 28 and the temperature sensing device may be an integrated piece operable to measure the pressure and temperature of the fluid within the pressure vessel. That is, the integrated pressure and temperature sensing device is preferably sized to be received within the first portion 22 of the valve stem 20. Alternatively, the channel 26 may be widened to receive the integrated pressure and temperature sensing device.

In the illustrated embodiment of FIG. 2, the pressure-sensing device 28 includes a series of wires 38 extending from one end which allow the pressure measurement to be communicated to an external, or internal, measuring device or plug 32 via receptacle 30. As will be understood, if an integrated temperature and pressure sensing device are used, the combined pressure and temperature measurements may be communicated to an external, or internal, measuring device or plug 32 via the receptacle 30.

Located within the channel 26 in the second portion 24 of the stem 20 is the receptacle 30. The receptacle 30 is operable to be in communication with the pressure-sensing device 28 and is also operable to be electrically connected to a measuring device or plug 32 at the opposite end from the connection to the pressure-sensing device 28. The receptacle 30 is operable to communicate with the pressure-sensing device 28, and in the illustrated embodiment, the wires 38 of the pressure-sensing device 28 are connected to the receptacle 30. The connection of the wires 38 may be made by any means known in the art, including soldering. Thus, since the receptacle 30 is electrically connected to the pressure-sensing device 28 and the plug or measuring device 32, it facilitates communication of a pressure reading from the pressure sensing device 28 to the plug or measuring device 32.

Figure 3:
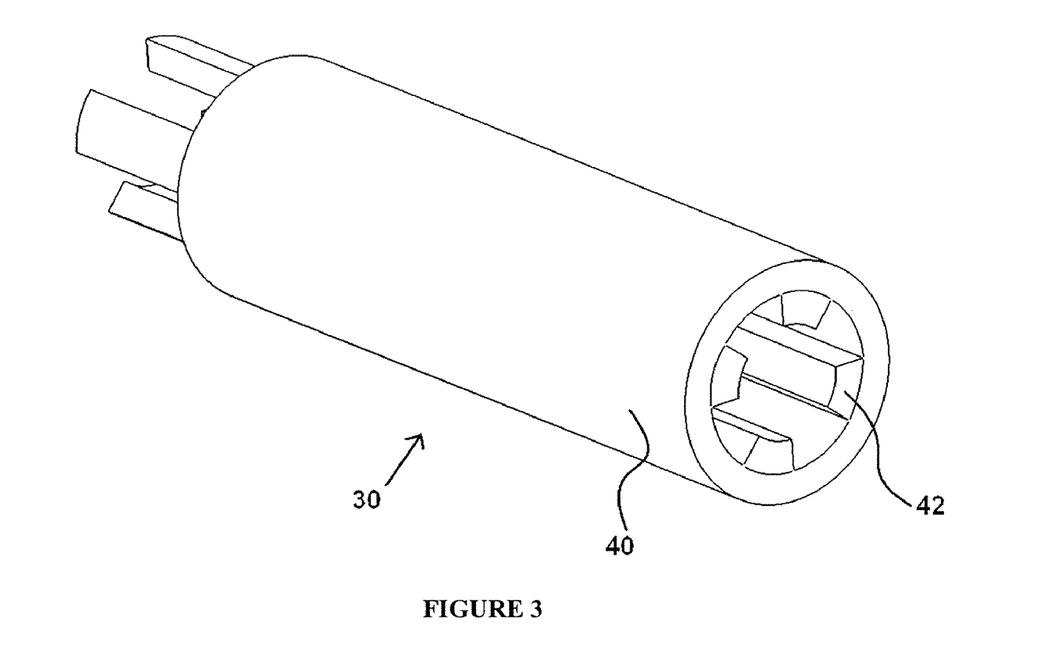
FIG. 3 is a perspective view of one embodiment of the receptacle of the present invention.

FIG. 3 illustrates one embodiment of the receptacle 30, comprising a hollow cylindrical shell portion 40 within which a series of strips 42 are received. The strips 42 are connected to the interior surface of the shell portion 40 at spaced intervals. The strips 42 are attached to the shell portion 40 by any means known in the art that will withstand the environment of the valve and maintain the strips 42 in their position. The strips 42 are made from a conductive material and allow for communication between the wires 38 of the pressure-sensing device 28 and a measuring device or plug 32. As can be seen more clearly in FIG. 8, the strips 42 extend outwardly past the shell portion 40 in the direction of the pressure-sensing device 28. The wires 38 of the pressure-sensing device 28 are connected to the strips 42 by any means known in the art, for example soldering.

The conductive material that is used is preferably inert to the fluid environment of the valve 18. The illustrated embodiment shows the receptacle 30 having four spaced strips 42 within it, however the number of strips and their size and configuration may vary provided that a conductive pathway is provided from the pressure-sensing device through the receptacle 30.

As stated above, the modified valve 18 allows for pressure measurements to be taken when desired with minimal interference with the valve operation and working fluid. Therefore, it will be understood that although variations to the number and positioning of the strips 42 may be made it is preferable to minimise the obstruction of the fluid through the receptacle 30.

Referring to FIGS. 3-7, alternative embodiments of the receptacle 30 are illustrated. Other variations of the receptacle 30 may be used to provide an electrical connection between the pressure-sensing device 28, and in particular the wires 38, and the plug or measuring device 32. As will be understood referring to FIGS. 3-7, the strips 42 are positioned on the receptacle 30 such as to provide sufficient separation therebetween so as to allow separation between the electrical connections on the strips 42. FIGS. 4 through 7 provide perspective drawings of other embodiments of the receptacle 30. In each of these figures it will be understood that the receptacle 30 is viewed from the end that is operable to connect to plug 32. The opposite end is connected to the wires 38 as described above.

Referring to FIGS. 4 to 7, at the end of each of the illustrated receptacles 30 a series of apertures, indicated generally at 44, are shown that are operable to connect to the plug 32. In these embodiments, the plug 32 will include protrusions, not shown, that will be sized and configured to be received within the apertures 44 to provide a connection there between.

Figure 4:
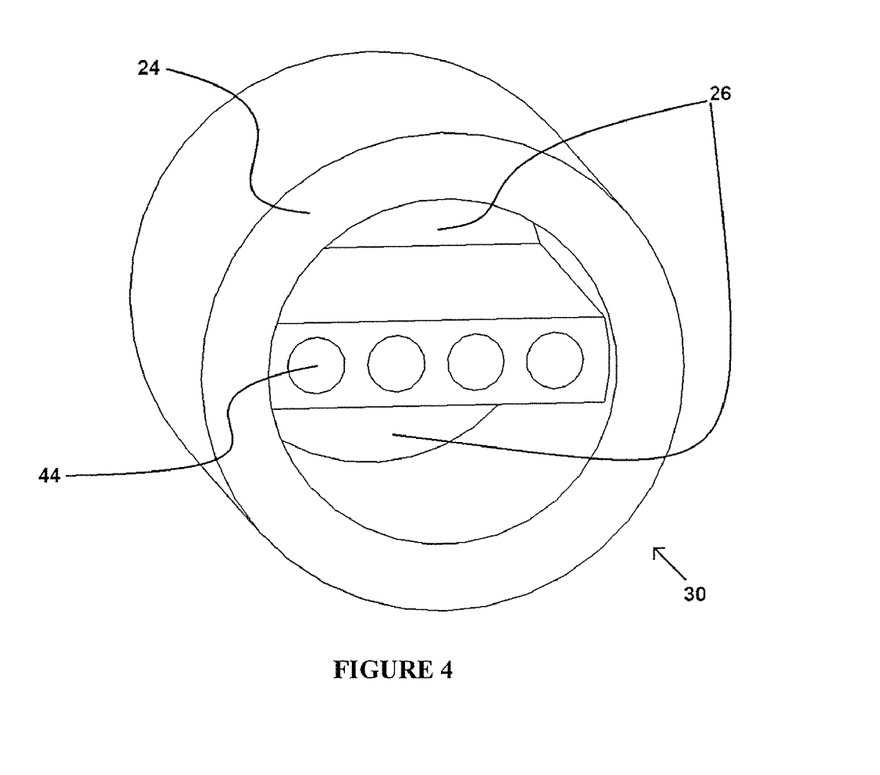
FIG. 4 is a perspective view of an alternate embodiment of the receptacle and the second portion of the modified valve stem of the present invention.

Each alternative embodiment of the receptacle 30 will now be described in more detail. FIG. 4 illustrates a receptacle 30 having a rectangular body with curved sides such as to be fittedly received within the channel 26. This involves machining grooves in the valve stem 20 (preferably the second portion 24) to accommodate the receptacle 30. In this embodiment illustrated, the apertures 44 are located within the rectangular body in a parallel line. Each aperture 44 is sized to receive a conductive strip 42. Fluid is operable to flow on either side of the rectangle through the valve body.

Figure 5:
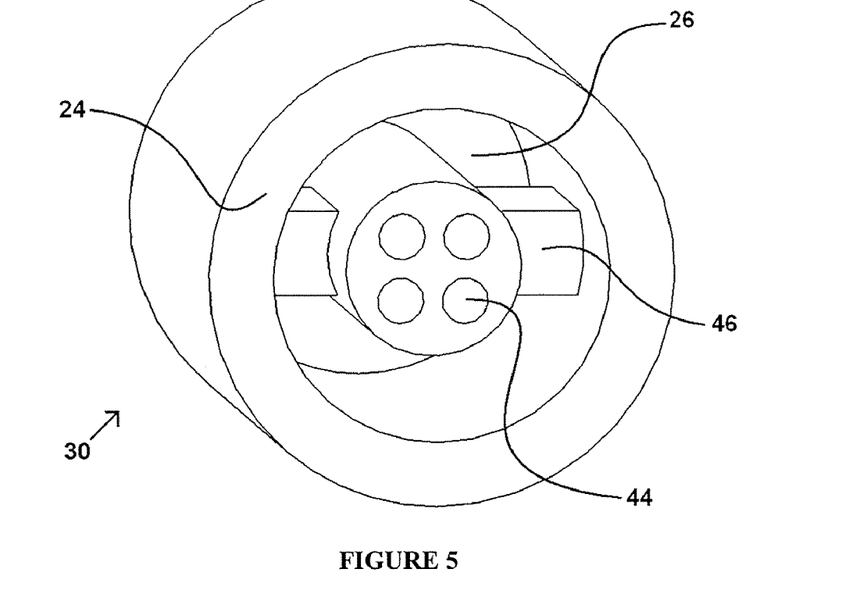
FIG. 5 is a perspective view of a further alternative embodiment of the receptacle and the second portion of the modified valve stem of the present invention.

FIG. 5 illustrates a circular or cylindrical embodiment of the receptacle 30 that includes a pair of locking tangs 46 for holding the connector 34 within the second portion 24 of the valve stem 20. The circular embodiment of the receptacle 30 is centrally located within the channel 26 and allows for fluid flow around the exterior circumference of the receptacle 30.

Figure 6:
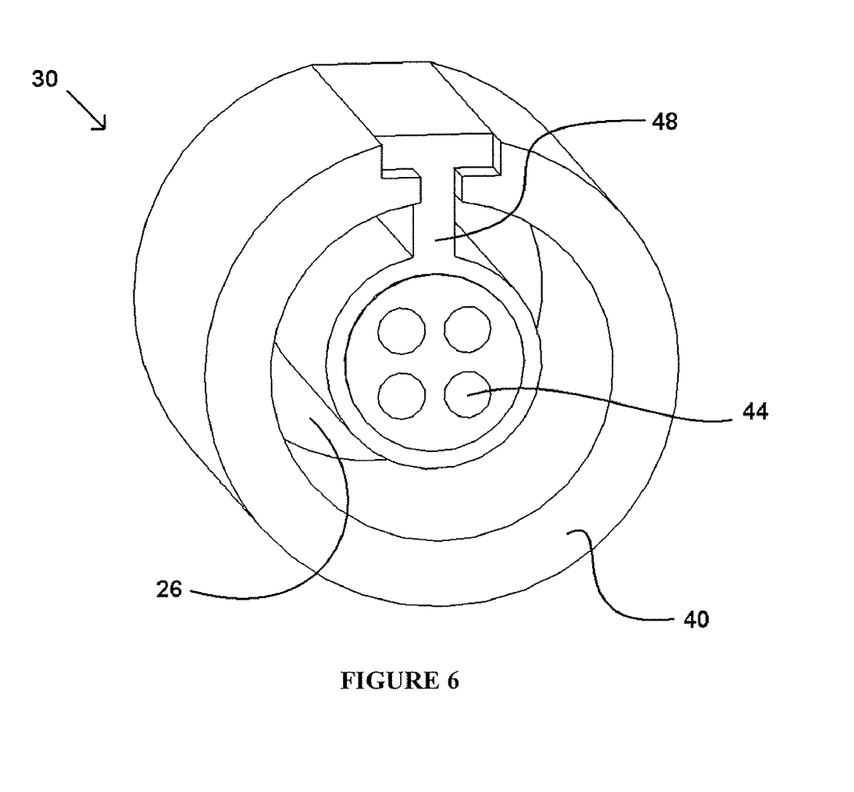
FIG. 6 is a perspective view of a further embodiment of the receptacle of the valve of the present invention.

FIG. 6 illustrates a circular or cylindrical receptacle 30 that is suspended within the channel 26 by a cover 48. It will be understood that in this embodiment the cover 48, that extends around the connector 34 and is held within the valve shell 40 by a tab like attachment point, is preferably made from a thin metal to minimise interference with fluid flow around the connector and also to allow the minimum fluid flow rate in which the metal is susceptible to fatigue from twisting due to high fluid pressures.

Figure 7:
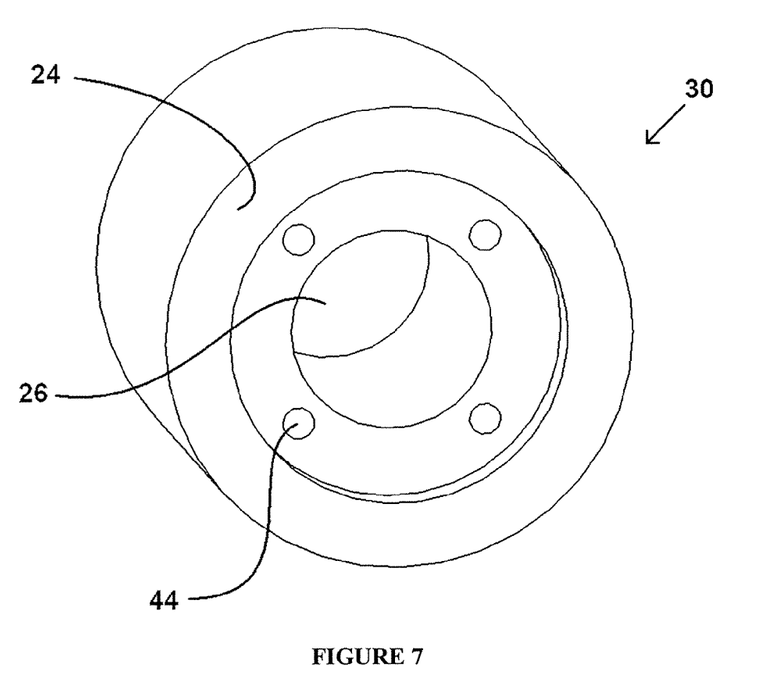
FIG. 7 is a perspective view of a further embodiment of the receptacle and the second part of the modified valve stem of the present invention.

FIG. 7 includes an alternate embodiment of the receptacle 30. According to the embodiment illustrated, the receptacle 30 is circular or cylindrical shaped and sized to fit within the channel 26. The illustrated circular receptacle 30 includes a hollow passageway therefore to allow for fluid flow. The apertures 44 are located within the walls of the receptacle 30.

Figure 8:
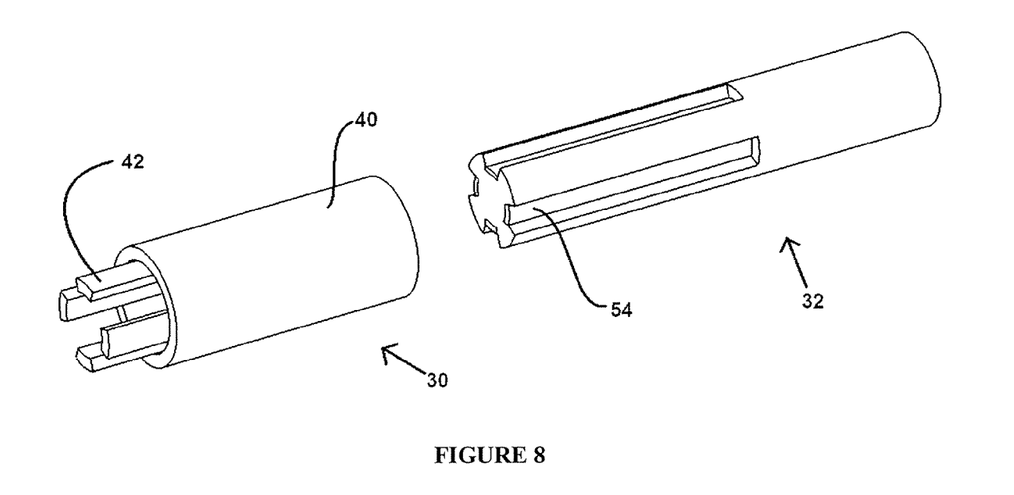
FIG. 8 is a perspective exploded view of the receptacle and plug of the valve of the present invention according to the embodiment illustrated in FIG. 3.

The plug 32 and its use will now be described in further detail. As stated above, the plug 32 may form part of the valve 18 or may be a separate unit that is used only when required. The plug 32 is operable to connect with the receptacle 30 at the opposite end from the pressure-sensing device 28. In the illustrated embodiment, as can be seen in FIG. 8, the plug 32 includes a contact end that includes a series of connectors 52 having contact strips 54 that are operable to mate with the strips 42 on the receptacle 30. The connection, or mating, of these two components can be clearly seen in FIGS. 9A and 9B. The connection of the two parts allows for electrical contact between the pressure-sensing device 28, the receptacle 30 and the plug 32 and therefore allows a pressure reading to be taken and communicated to a user.

It will be understood that the connection point between the receptacle 30 and the plug 32 may be made by other means. For example, and as described above, in the alternative embodiments of the receptacle 30 a series of apertures 44 were provided for receiving protrusions on the plug 32 to allow for a connection between the pressure-sensing device, the receptacle 30 and the plug 32.

Figure 10:
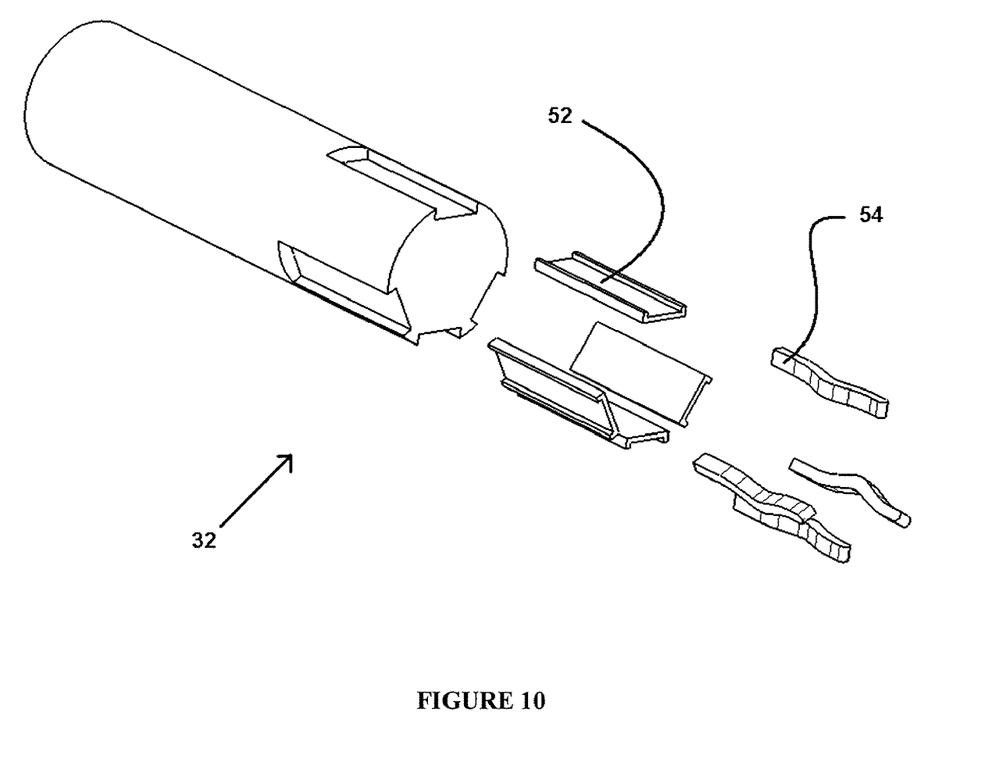
FIG. 10 is an exploded perspective view of one embodiment of the plug construction of the present invention.

FIG. 10 provides an exploded perspective view of the embodiment of the plug described above, including contact strips 54 received in the connectors 52 sized to engage with the strips 42 on the receptacle 30.

Figure 9A:
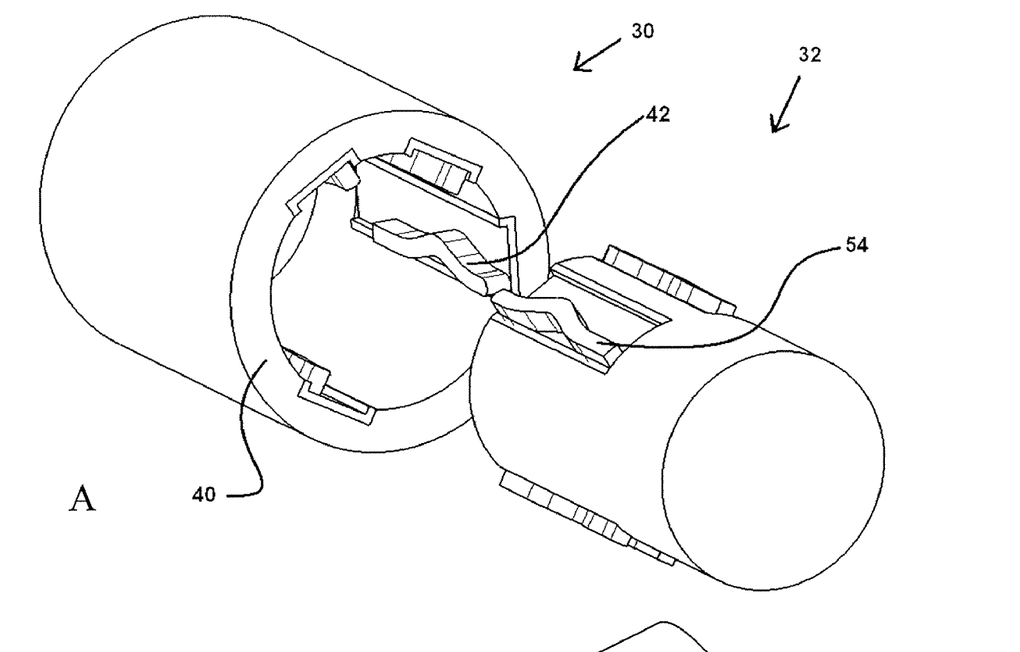
FIG. 9a is a perspective exploded view of the mating orientation of the receptacle and plug of the present invention.
Figure 9B:
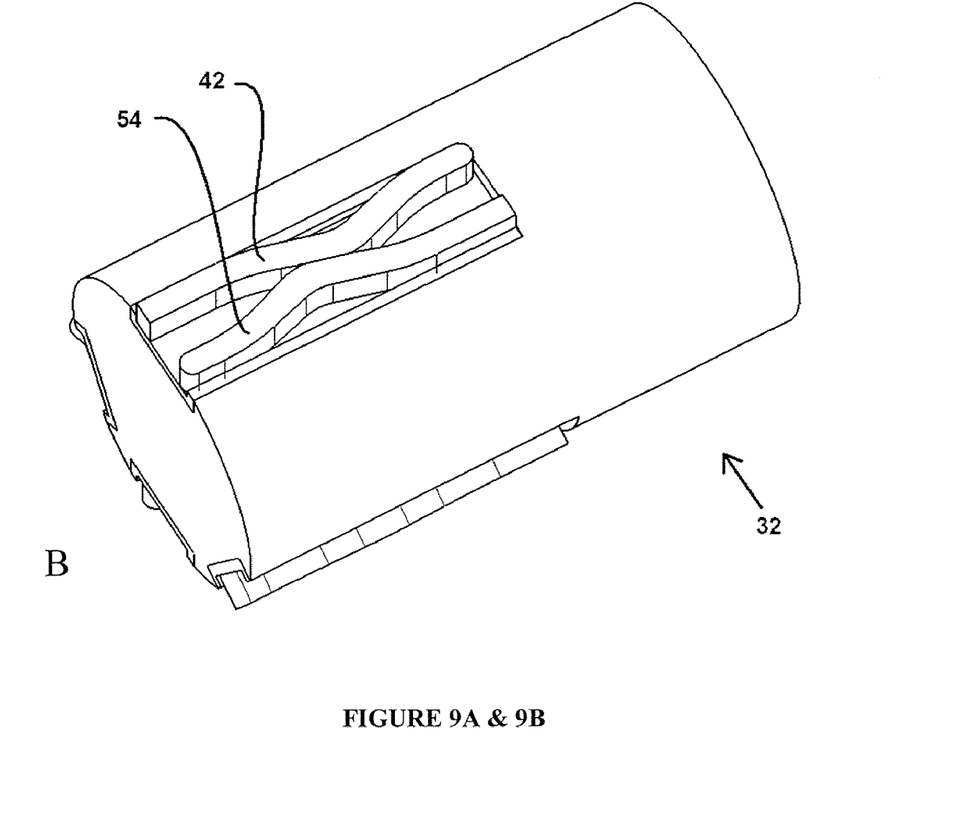

As can be seen in FIGS. 9A and 9B the contact strips 54 of the plug 32 and the strips 42 of the receptacle 30 may be slightly curved to ensure a secure lock between the components when mated. The insulation between each mating set of contact strips is the shell portion 40 of the receptacle 30 shown in FIG. 9A. The shell portion 40 that mounts the conductive strips is preferably a dielectric plastic material such as Delrin or PEEK. The conductive strips are therefore mounted on an insulating mount, i.e. the shell portion, when located in the conductive stainless steel of the valve stem.

To ensure that the plug 32 and receptacle 30 mate in the appropriate orientation (to ensure that the correct electrical connections are made), the strips 42 and contact strips 54 may be offset radially as shown in FIG. 10 to ensure that only one mating orientation works. Furthermore, one of the strips 42 of the receptacle 30 may be made deeper than the other strips to provide a mechanical guideway—the plug 32 would not fit into the hole in receptacle 30 unless rotated to the appropriate position.

Figure 11:
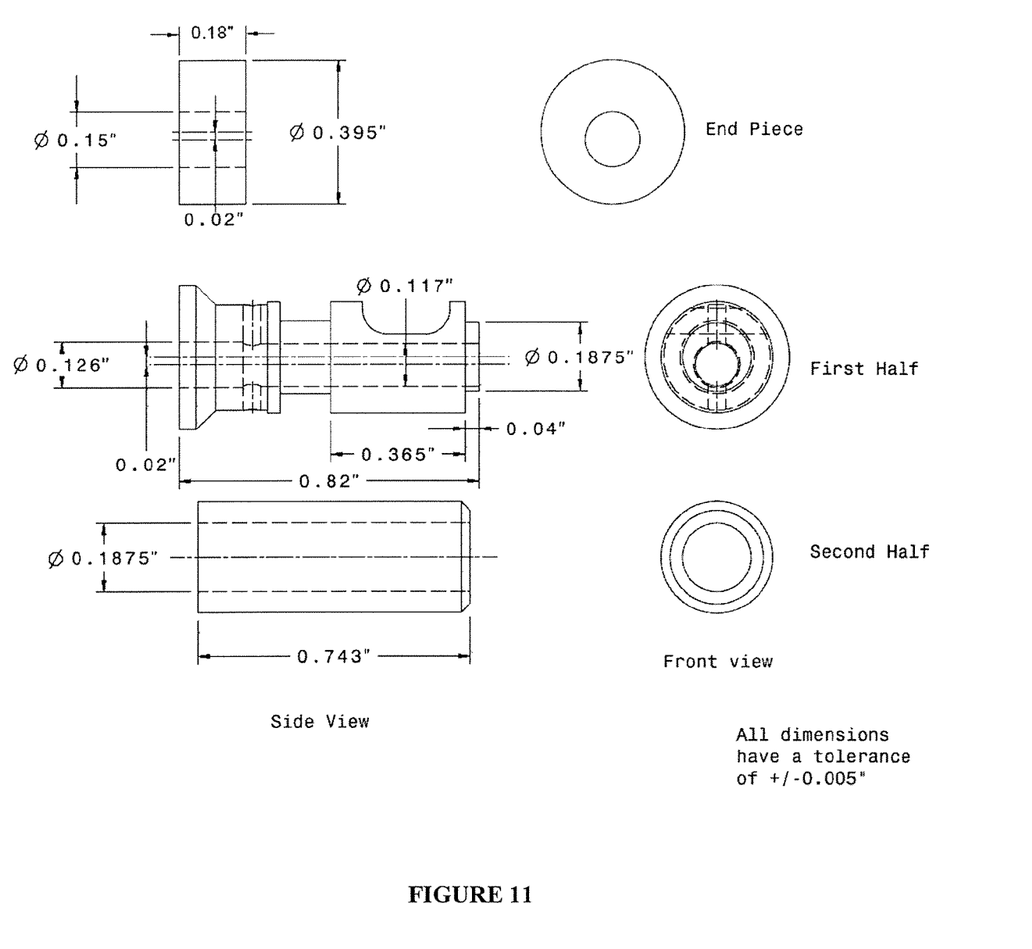
FIG. 11 is a schematic showing the stem machining modifications for one embodiment of the valve of the present invention.

An example of the machining requirements for one embodiment of the present invention is provided in FIG. 11. However, it will be understood that these are merely provided as an example and are not meant to be limiting in any way. The machining requirements may be changed depending on the valve size and the configuration of the connector and pressure sending device and plug to be utilised within the valve.

The valve main body or stem 20 may be modified as follows: carve a 0.04" wide groove around the circumference of the stem 0.8" from the left and cut the stem in half at 0.84" starting from left of stem. As discussed above, this provides a two-part valve stem 20 that assists in the positioning and securing of the receptacle 30 to the wires 38 of the pressure-sensing device 28. However, this is not required and the receptacle 30 may be placed within the valve body/stem 20 while the stem 20 comprises one unitary piece.

Once the valve stem 20 has been divided into two pieces the first piece of the stem may be adapted to include a hole in the end facing the second stem piece with diameter 0.1170" offset from centre with a depth of 0.6450" using standard drill size 0.1142"+0.004/−0.001. A second hole at the opposite end (where the pressure-sensitive face of the transducer will be) may be drilled with diameter of 0.126" and a depth of 0.1750", using standard drill size 0.1260"+0.005/−0.001.

The second half of the stem may be hollowed out to a diameter of 0.2000" along the length of the piece. This could be done using a standard drill size 0.2008"+0.005/−0.001.

In addition a cylindrical end piece 72 is machined with a diameter of 0.395" and length 0.180" with an offset through hole with diameter 0.15", using a standard drill size 0.1496"+0.005/−0.001. This hole would align with the hole through the first stem piece 22.

The installation of the pressure-sensing device 28 will now be described with reference to FIGS. 12 and 13.

In the illustrated embodiment, there were two methods that may be used to secure the pressure transducer or pressure sensing device 28 in place. Either: (i) Using Room Temperature Vulcanized rubber 56 potting compound & epoxy 58, shown in FIG. 12 or (ii) micro laser welding 60 it in place, shown in FIG. 13.

Figure 12:
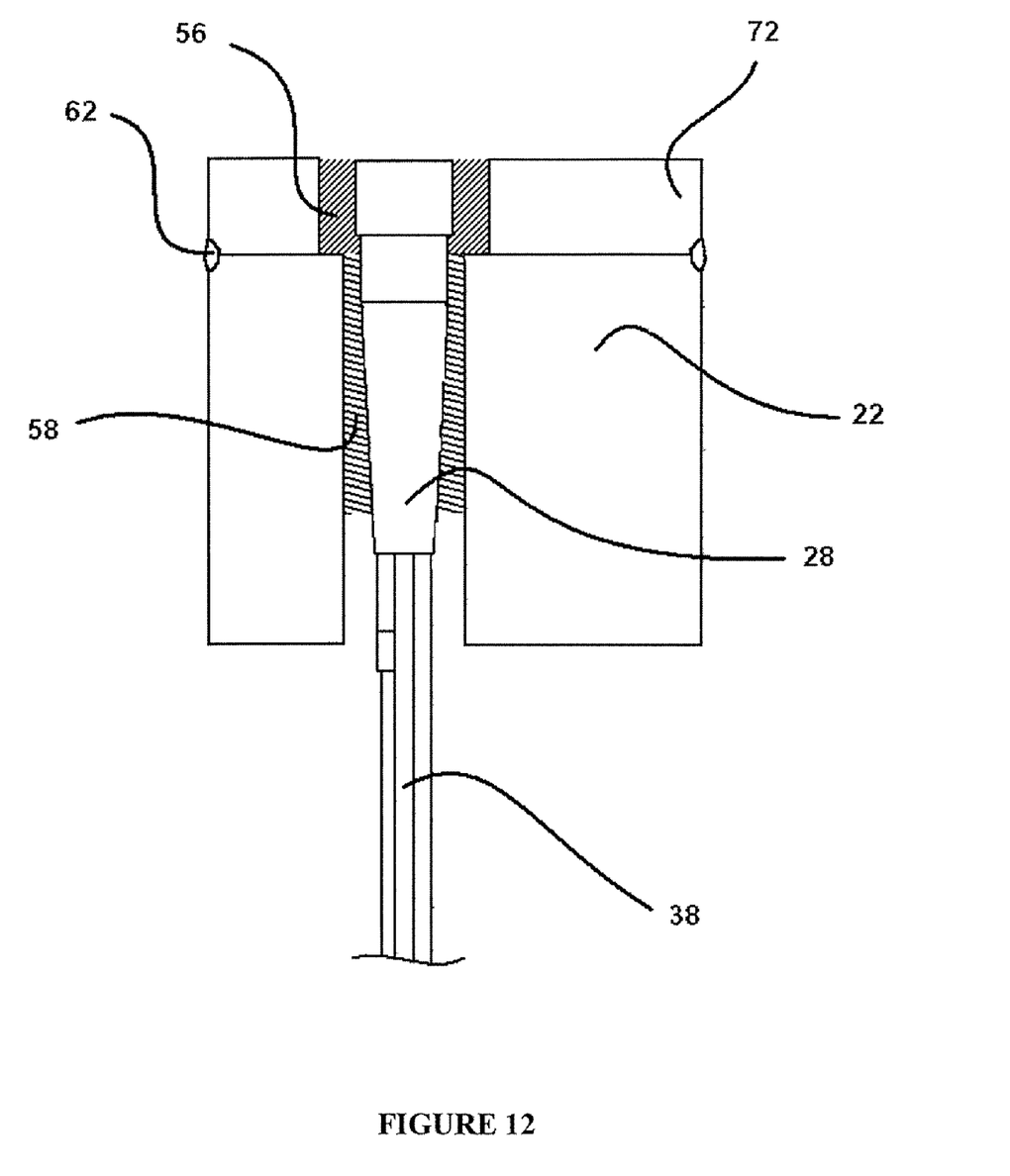
FIG. 12 is a side cross-sectional view of the placement and connection of the pressure-sensing device of the present invention.

When following the method illustrated in FIG. 12, i.e. RTV 56 potting and epoxy 58, the end piece 72 of the stem must be hermetically laser welded 62 onto the first half of the stem. The pressure-sensing device 28 is then put in place using the epoxy 58 near the lower portion of the transducer and potting 56 surrounding the head. This is to prevent residual stress caused by the epoxy curing from affecting the strain and pressure readings on the pressure-sensitive face of the transducer.

Figure 13:
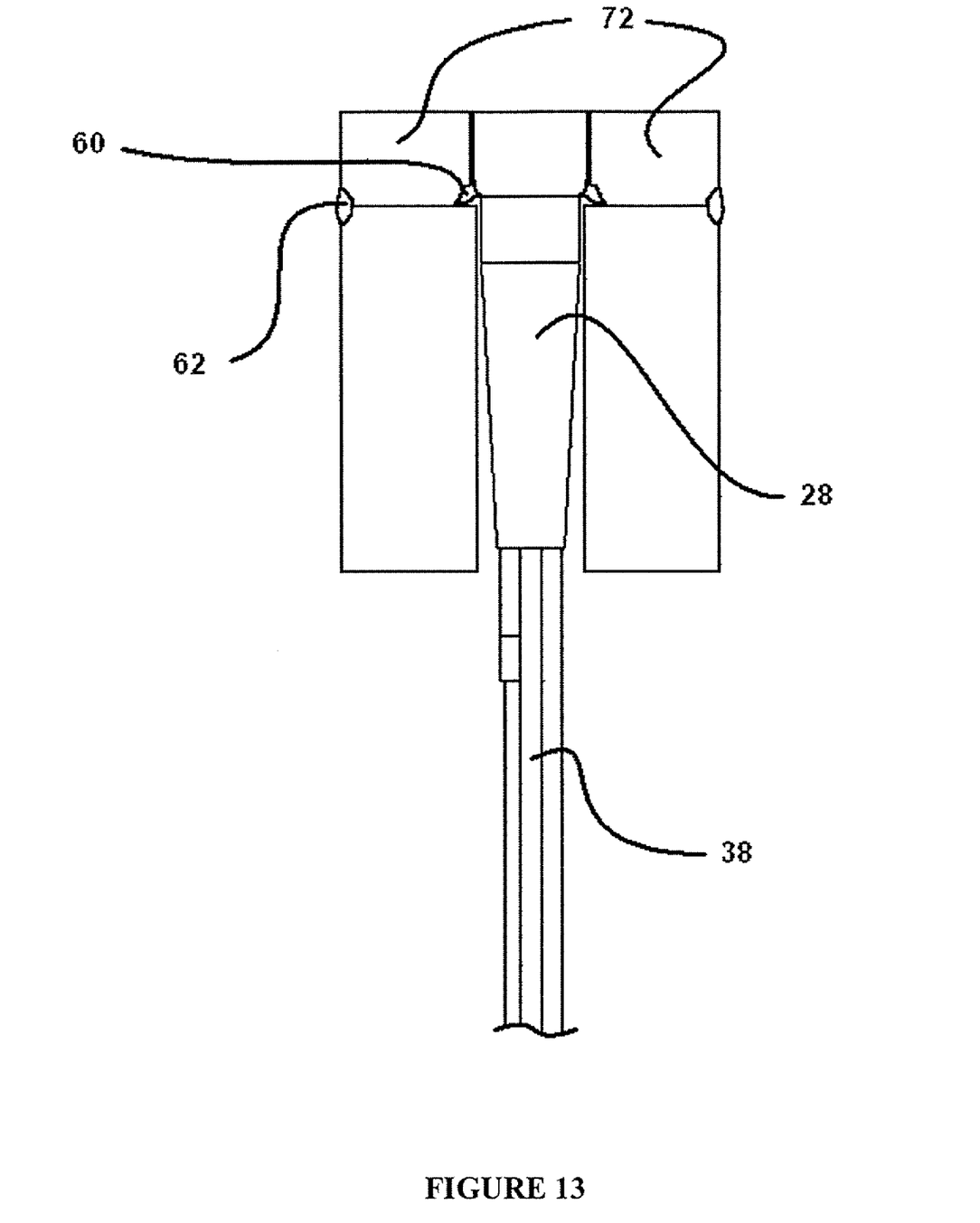
FIG. 13 is a side cross-sectional view illustrating the welding of the pressure-sensing device during installation according to one embodiment.

If using a laser weld, as illustrated in FIG. 13, to install the pressure-sensing device, insert the transducer 28 into the end piece 72 until the pressure-sensitive face is flush with the surface of the end piece. Then weld 60 the two parts together around the circumference of the transducer over the existing weld left from the construction of the transducer where it protrudes from the other side of the end piece. Place the assembled end piece and transducer at the end of the first stem piece with the transducer wires extending through the stem hole. Weld 62 the end piece 72 to the first stem piece 22 around the circumference where the two parts meet.

Figure 14:
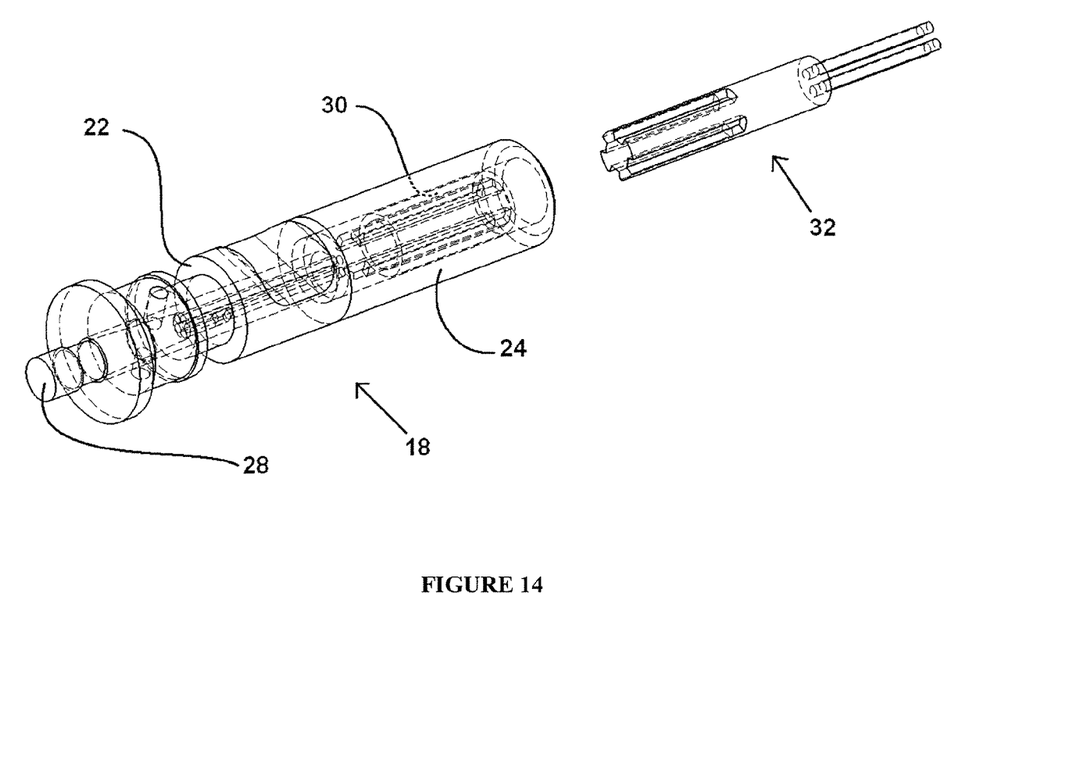
FIG. 14 is an exploded perspective view illustrating the plug, and the assembly of the receptacle, the pressure-sensing device, and the valve stem according to one embodiment of the present invention.

The assembly of the modified valve 18 of the present invention will now be described with reference to FIGS. 14 and 15.

To assemble the system, the pressure-sensing device 28 should first be connected to the first portion 22 of the valve main body 20, as described above. The wires 38 from the pressure-sensing device 28, which protrude from the first portion of the main body 20 may be formed into one wire. The wires or wire, may then be soldered onto the receptacle 30 (e.g. onto the strips 42). The receptacle 30 is then placed within the second portion 24 of the main body 20 and the first and second portions are connected together. Preferably the first and second portions (22, 24) are hermetically laser welded together. The modified valve 18 can then be reassembled with the unmodified valve housing 74 and locking nut 76 to make the valve functional.

Figure 15:
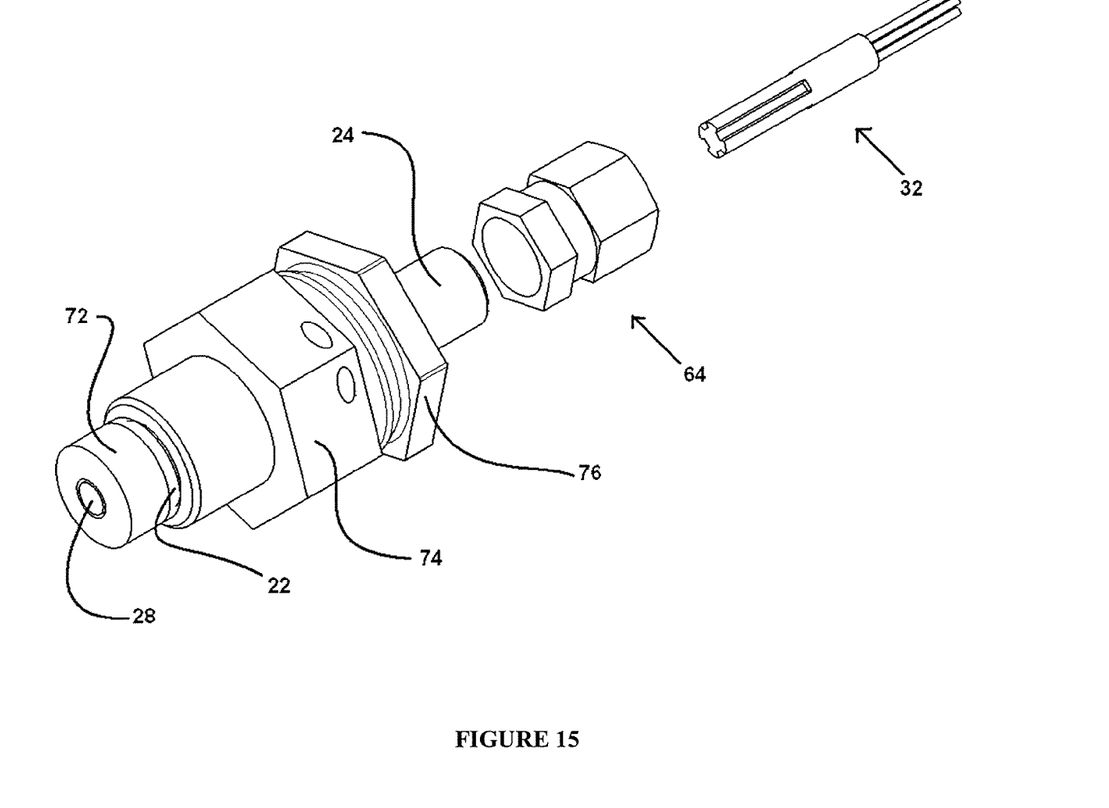
FIG. 15 is a perspective view of one embodiment of the fully assembled valve of the present invention with the cap off.

The valve 18 may also include a cap 64, shown in FIG. 15. The cap 64 fits on the end of the second portion of the valve body and provides a dust cap or seal. In one embodiment, the cap 64 may include the plug 32 which may be operable to be in communication with the receptacle 30 during the operation of the aircraft, i.e. pressure readings may be taken during operation of the aircraft whenever required. Alternatively, the cap 64 may be manually removed and the plug 32 be contained as a separate unit, for example a handheld unit, and connected to the receptacle 30 if and when a pressure reading is required.

The present invention provides a modified valve according to the above description that includes a pressure-sensing means and a receptacle or connector that allows for periodic or continual communication with the pressure-sensing means. In another aspect the present invention provides a method for retrofitting a valve within a pressure vessel to incorporate a pressure-sensing device within it. In a further aspect the present invention provides a pressure-sensing retrofit device that includes a connector that may be installed in a valve to allow for pressure measuring with minimal interference with the valve.

The present invention provides a standard charging valve modified to add a pressure transducer with the active diaphragm subjected to the pressure within the charged vessel. The present invention further provides an arrangement to allow the wires and connector to not interfere with the flow of gas or oil so as to not interfere with normal servicing.

Figure 16:
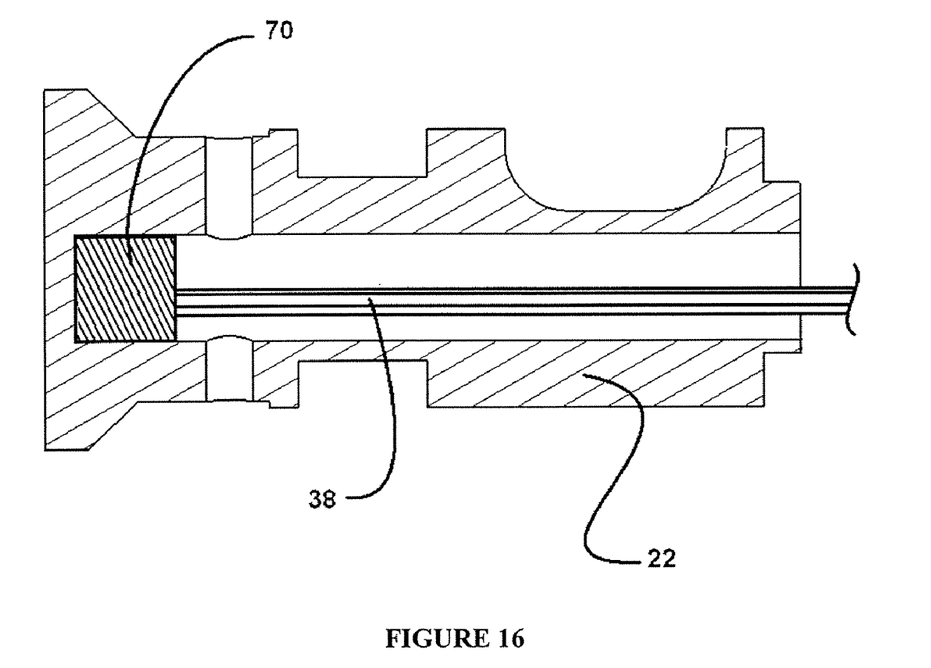
FIG. 16 is a cross-sectional view of an alternative embodiment of the valve of the present invention wherein the valve is modified to form a pressure sensitive diaphragm that is gauged.

In a further embodiment of the present invention the existing end of the valve may be modified to form a pressure sensitive diaphragm, which is then gauged. The gauges are indicated at numeral 70 and may be attached directly into the valve stem. FIG. 16 illustrates the inclusion of a gauge 70 in the valve stem with wires 38 extending from the gauge. The wires are as described herein and may connect in a similar manner as described above.

Figure 17:
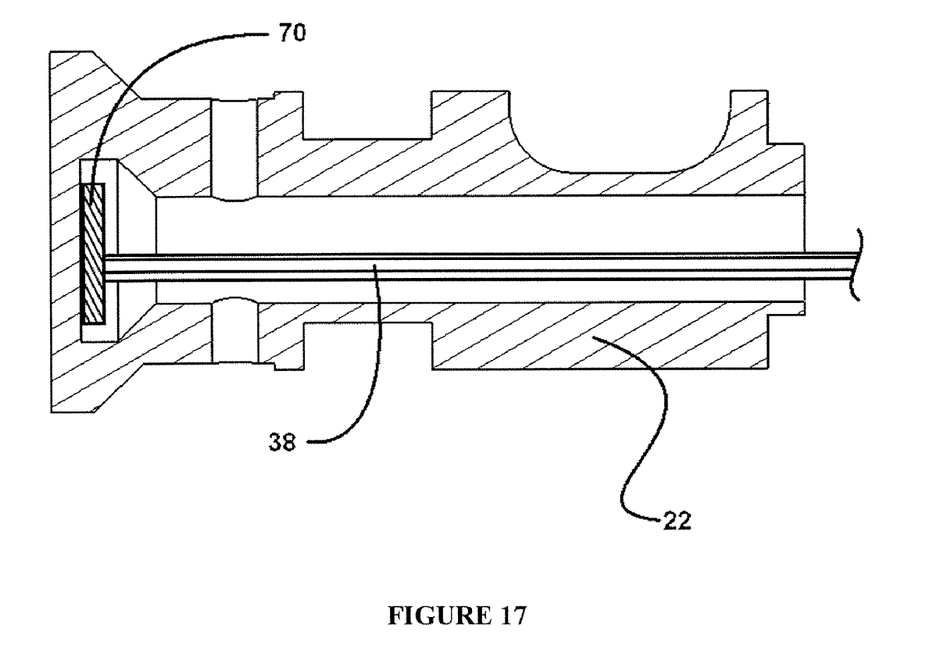
FIG. 17 is a cross-sectional view of a further embodiment of the valve of FIG. 16 in which the valve stem has been modified to include a cavity in its end.

FIG. 17 illustrates a further embodiment of the valve including the gauge in which the stem of the valve is modified to include a cavity that has been formed in one end of the valve. The cavity may be formed by machining and then welding the stem or by electro discharge machining (EDM). The strain gauge 70 may then be adhered in the cavity and the wires extend therefrom as described above. It will be understood that the gauge and wires may replace the pressure-sensing device described in the above embodiments.

While this invention has been described with reference to illustrative embodiments and examples, the description should not be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

Any publications, patents and patent applications referred to herein are incorporated by reference in their entirety to the same extent as if each individual publication, patent or patent application was specifically and individually indicated to be incorporated by reference in its entirety.

What is claimed is:

1. A charging valve for use in a pressure vessel in an aircraft landing gear comprising:
   a valve stem having a first and second end and a channel extending therebetween;
   a pressure-sensing device received within the channel at the first end and operable to measure the pressure of the pressure vessel; and
   a receptacle received within the channel between the pressure-sensing device and the second end and operable to be in communication with the pressure-sensing device and configured to allow fluid to flow through the valve.

2. The charging valve according to claim 1, wherein the pressure-sensing device comprises at least one wire extending from one end in electrical contact with the receptacle.

3. The charging valve according to claim 1, wherein the receptacle is securely attached within the channel between the pressure-sensing device and the second end.

4. The charging valve according to claim 2, wherein the receptacle comprises a hollow cylindrical body and at least one conductive strip secured to the inside surface of the hollow body.

5. The charging valve according to claim 4, wherein the at least one conductive strip is connected to the at least one wire of the pressure-sensing device.

6. The charging valve according to claim 1, wherein the receptacle is operable to communicate with a measuring device for communicating a pressure reading from the pressure-sensing device thereto.

7. The charging valve according to claim 6, wherein the receptacle is operable to receive the measuring device therein to allow for communication between the receptacle and the measuring device.

8. The charging valve according to claim 5, wherein the at least one conductive strip is further operable to electrically connect with at least one corresponding connection strip located on a measuring device allowing communication of a pressure reading from the pressure-sensing device to the measuring device.

9. The charging valve according to claim 1, further comprising temperature-measuring means.

10. The charging valve according to claim 9, wherein the temperature-measuring means is integrated with the pressure-sensing device and received within the channel at the first end and operable to measure the temperature of the pressure vessel.

11. The charging valve according to claim 9, wherein the temperature measuring means is selected from the group consisting of: a thermocouple, and a resistance temperature detector.

12. The charging valve according to claim 2, wherein the receptacle comprises a substantially rectangular body having curved sides sized to be received within the channel, the rectangular body having at least one aperture, each aperture defined by an interior surface having a conductive strip secured thereon.

13. The charging valve according to claim 12, wherein each conductive strip is connected to the at least one wire of the pressure-sensing device.

14. The charging valve according to claim 13, wherein the at least one conductive strip is further operable to electrically connect with at least one corresponding connection strip located on a measuring device for communication therebetween.

15. The charging valve according to claim 12, wherein the substantially rectangular body is sized to occupy a portion of the channel to allow fluid to flow through the valve on either side of the rectangular body.

16. The charging valve according to claim 2, wherein the channel is defined by an inner sidewall and the receptacle comprises a cylindrical body centrally located within the channel and securing means for coupling the cylindrical body to at least a portion of the inner sidewall.

17. The charging valve according to claim 16, wherein the securing means comprises a pair of locking tangs sized to fit between the cylindrical body and the inner sidewall.

18. The charging valve according to claim 17, wherein the cylindrical body comprises apertures formed at one end and at least one conductive strip received within the aperture.

19. The charging valve according to claim 18, wherein the at least one conductive strip is connected to the at least one wire of the pressure-sensing device.

20. The charging valve according to claim 19, wherein the at least one conductive strip is further operable to electrically connect with at least one corresponding connection strip located on a measuring device for communication therebetween.

21. The charging valve according to claim 2, wherein the receptacle comprises a hollow cylindrical body having an exterior cylindrical wall and an interior cylindrical wall, the exterior cylindrical wall securely attached within the channel, and the cylindrical body having apertures formed at one end between the interior and exterior cylindrical walls for receiving at least one conductive strip connected to the at least one wire of the pressure-sensing device.

22. A method of modifying a charging valve having a main body including a channel therethrough, to include a pressure measuring device for use in a pressure vessel comprising the steps of:
   (i) placing a pressure-sensing device within the channel at the end of the valve that is in communication with the pressure vessel to allow the pressure-sensing device to measure the pressure within the vessel;
   (ii) connecting the pressure-sensing device to a receptacle to allow for communication therebetween, the receptacle being located within the channel of the valve at the opposite end of the pressure-sensing device from the measurement end and being operable to allow for fluid to flow through the valve.

23. A charging valve for use in a pressure vessel in an aircraft landing gear comprising:
   a valve stem having a first and second end and a channel extending therebetween;
   a pressure reading means connected to the first end of the valve body for reading the pressure in the pressure vessel; and a receptacle received within the channel between the pressure reading means and the second end and operable to be in communication with the pressure reading means and configured to allow fluid to flow through the valve.

24. The charging valve according to claim 23, wherein the pressure reading means comprises a diaphragm and a gauge connected to the diaphragm for reading the pressure measured by the diaphragm.

25. The charging valve according to claim 23, further comprising temperature measuring means.

* * * * *